(12) United States Patent
Nakanishi et al.

(10) Patent No.: US 7,207,169 B2
(45) Date of Patent: Apr. 24, 2007

(54) SYSTEM AND METHOD FOR PURIFYING AN EXHAUST GAS

(75) Inventors: Yoshiyuki Nakanishi, Saitama (JP); Kenji Dosaka, Saitama (JP); Masanobu Miki, Saitama (JP); Keizo Iwama, Saitama (JP); Kazuhide Terada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/090,027

(22) Filed: Mar. 28, 2005

(65) Prior Publication Data

US 2005/0217241 A1   Oct. 6, 2005

(30) Foreign Application Priority Data

Mar. 31, 2004   (JP) ............................. 2004-106440

(51) Int. Cl.
*F01N 3/00*   (2006.01)

(52) U.S. Cl. ............................. 60/275; 60/274; 60/286; 60/301

(58) Field of Classification Search .................. 60/274, 60/275, 286, 295, 301, 303; 422/168, 177
See application file for complete search history.

(56) References Cited

U.S. PATENT DOCUMENTS

| | | | |
|---|---|---|---|
| 6,038,854 A | 3/2000 | Penetrate et al. | |
| 6,185,930 B1 * | 2/2001 | Lepperhoff et al. | ........... 60/274 |
| 6,363,714 B1 * | 4/2002 | Hoard et al. | ................... 60/275 |
| 6,479,023 B1 * | 11/2002 | Evans et al. | ........... 422/186.04 |
| 6,775,972 B2 * | 8/2004 | Twigg et al. | .................. 60/275 |
| 6,887,438 B2 * | 5/2005 | Labarge et al. | ............. 422/177 |
| 2003/0056499 A1 | 3/2003 | Binder et al. | |
| 2004/0175305 A1 | 9/2004 | Nakanishi et al. | |

FOREIGN PATENT DOCUMENTS

| | | |
|---|---|---|
| EP | 1 216 746 A2 | 6/2002 |
| EP | 1 426 102 A2 | 6/2004 |
| JP | 2002-210366 | 7/2002 |
| WO | 99/12638 A | 3/1999 |
| WO | 00/43102 A | 7/2000 |

* cited by examiner

*Primary Examiner*—Thomas Denion
*Assistant Examiner*—Diem Tran
(74) *Attorney, Agent, or Firm*—Arent Fox LLP

(57) ABSTRACT

A system for purifying an exhaust gas includes a plasma unit and a catalyst unit. The plasma unit generates energetic plasma species which react with particulate matters and nitrogen oxides contained in the exhaust gas. The catalyst unit has a catalyst which reacts with the exhaust gas. The plasma unit is disposed upstream relative to the catalyst unit in a direction of flow of the exhaust gas and the system provides sequential purification for the particulate matters and the nitrogen oxides.

14 Claims, 8 Drawing Sheets

FIG.7

| TYPE OF ENGINE | 4-CYCLE WATER-COOLED DIESEL ENGINE (3 CYLINDERS) |
|---|---|
| AIR VOLUME DISPLACEMENT | 1061 cm$^3$ |
| FUEL | DIESEL FUEL |
| RATED POWER OUTPUT | 12 kVA |

FIG.8

| COMPOSITION | CONCENTRATION |
|---|---|
| NO | 300ppm |
| $C_3H_6$ | 210ppmC |
| CO | 1100ppm |
| $O_2$ | 15% |
| $CO_2$ | 4% |
| $H_2O$ | 4% |
| $N_2$ | RESIDUAL |

FIG.9

|  | | EXAMPLE 1 | EXAMPLE 2 | EXAMPLE 3 |
|---|---|---|---|---|
| FIRST PLASMA UNIT (10 LAYERS) | AVERAGE POWER (W) | 30 | 40 | — |
| | TOTAL VOLUME OF PLASMA SPACE ($cm^3$) | 5.0 | 5.0 | 5.0 |
| | POWER DENSITY OF PLASMA SPACE ($W/cm^3$) | 6.0 | 8.0 | — |
| SECOND PLASMA UNIT (3 LAYERS) | AVERAGE POWER (W) | 10 | 10 | — |
| | TOTAL VOLUME OF PLASMA SPACE ($cm^3$) | 4.5 | 4.5 | 4.5 |
| | POWER DENSITY OF PLASMA SPACE ($W/cm^3$) | 2.2 | 2.2 | — |

SYSTEM AND METHOD FOR PURIFYING AN EXHAUST GAS

BACKGROUND OF THE INVENTION

The present invention relates to a system and method which are able to purify particulate matters (hereinafter referred to as PM) and nitrogen oxides (hereinafter referred to as $NO_x$) contained in an exhaust gas discharged from an internal combustion engine, such as a diesel engine mounted on an automobile, by means of plasma and a catalyst.

An exhaust gas, which is discharged from an internal combustion engine such as a diesel engine or lean burn engine mounted on an automobile, contains particulate matters (PM). It is known that a diesel particulate filter (hereinafter referred to as DPF) is installed downstream an internal combustion engine so as to reduce PM. A DPF, which generally includes a porous filter made of ceramics, decreases PM so as to purify an exhaust gas. This is carried out by making the exhaust gas pass through the DPF so as to separate and collect PM.

When the DPF captures a certain amount of PM, its reactivation is conducted by burning the PM with heated exhaust gas, for example, which is obtained by controlling an engine.

The exhaust gas also contains nitrogen oxides ($NO_x$). A first method for reducing $NO_x$ is known as Hydro Carbon Selective Catalytic Reduction (HC-SCR), which provides purification of $NO_x$ by its reaction with hydrocarbons (hereinafter referred to as "HC"), using a catalyst for selective reduction of $NO_x$. The hydrocarbons include unburned HC contained in the exhaust gas or HC contained in light oil or gasoline which is added to the exhaust gas. A second method uses a $NO_x$ adsorptive catalyst, which temporarily adsorbs $NO_x$. This catalyst adsorbs $NO_x$ under a lean condition (oxygen excessive ambient) and releases the adsorbed $NO_x$ under a rich condition (oxygen lacking ambient), to which HC is added. A third method using a Urea Selective Catalytic Reduction (also referred to as Urea-SCR) is known. In this method, urea is added to an exhaust gas so as to produce ammonia ($NH_3$) with a catalyst, which subsequently experiences a reaction with $NO_x$. A fourth method uses a plasma assist catalyst for purification of $NO_x$. Japanese Published Patent Application 2002-210366 discloses a technique related to the fourth method.

However, there has been a problem that use of DPF made of a porous filter, which causes poor flow of an exhaust gas due to greater resistance (pressure loss), does not allow efficient utilization of engine power. DPF has another problem that its reactivation requires controlling of an engine described above and its temperature possibly exceeds 1000 degrees Celsius during reactivation, which results in damage of DPF such as melting and breaking.

The first method described above has posed a problem that there is not sufficient unburned HC in an exhaust gas. The second method has a problem that it is necessary to control concentration of the oxygen in an exhaust gas and fuel consumption worsens significantly as a result of adding excessive HC relative to an amount of air breathed in. The third method has a problem that it requires apparatus for urea such as a tank and a supply device and furthermore an infrastructure for supplying urea to users. In addition, the third method has another problem that ammonia accidentally happens to escape from an automobile (ammonia slip). None of the first to fourth methods has been able to remove PM.

SUMMARY OF THE INVENTION

The present invention seeks to provide a system and method which are able to sequentially purify PM and $NO_x$ contained in an exhaust gas.

It is an aspect of the present invention to provide a system for purifying an exhaust gas, which comprises a plasma unit and a catalyst unit. The plasma unit generates energetic plasma species which react with particulate matters and nitrogen oxides contained in the exhaust gas. The catalyst unit has a catalyst which reacts with the exhaust gas. The plasma unit is disposed upstream relative to the catalyst unit in a direction of flow of the exhaust gas and the system provides sequential purification for the particulate matters and the nitrogen oxides.

In the system described above, the energetic plasma species oxidize the particulate matters, leading to purification of the exhaust gas. The energetic plasma species react with $NO_x$ to form $NO_2$ and the like. This $NO_2$ experiences purification through reduction by the catalyst. In this way, it is possible to sequentially purify the particulate matters (PM) and nitrogen oxides ($NO_x$).

It is another aspect of the present invention to provide a system for purifying an exhaust gas, wherein the plasma unit is adapted to generate more of first energetic plasma species upstream, which principally react with the particulate matters and more of second energetic plasma species downstream, which principally react with the nitrogen oxides.

In the system described above, it is possible for the first energetic plasma species to purify the particulate matters more efficiently upstream in the plasma unit. This increases the durability of plasma unit because the particulate matters tend not to adhere to electrodes for generating plasma.

On the other hand, the second energetic plasma species react with $NO_x$ to form $NO_2$, which is purified by the catalyst.

There are methods to generate more of the first energetic plasma species upstream and more of the second energetic plasma species downstream in the plasma unit. For example, the methods include an arrangement, where the number of electrodes, spacing and imposed voltage are varied step by step from upstream to downstream in a direction of flow of the exhaust gas so that power density of plasma space decreases accordingly.

It is still another aspect of the present invention to provide a system for purifying an exhaust gas, wherein the plasma unit comprises a first plasma unit for generating the first energetic plasma species and a second plasma unit for generating the second energetic plasma species, and the first plasma unit is disposed upstream relative to the second plasma unit.

In the system described above, the first plasma unit is able to generate the first energetic plasma species and the second plasma unit the second energetic plasma species, respectively.

It is yet another aspect of the present invention to provide a system for purifying an exhaust gas, wherein a power density of plasma space generated by the first plasma unit is not less than 0.8 $W/cm^3$ and a power density of plasma space generated by the second plasma unit is from 0.4 to 9.5 $W/cm^3$.

In the system described above, it is possible not only to efficiently purify PM with the first energetic plasma species, but also to efficiently transform $NO_x$ into $NO_2$ and the like with the second energetic plasma species.

Generally speaking, transformation of $NO_x$ into $NO_2$ does not require such higher power density of plasma space as that required for purification of PM. When power density of the second plasma unit is selected to be less than that of the first plasma unit, it is possible to prevent wasteful consumption of power.

It is a further aspect of the present invention to provide a system for purifying an exhaust gas, wherein the catalyst comprises a catalyst for selective reduction of $NO_x$.

In the system described above, it is possible for the catalyst for selective reduction of $NO_x$ to efficiently decompose $NO_x$ such as $NO_2$ so as to purify the exhaust gas.

It is a still further aspect of the present invention to provide a system for purifying an exhaust gas, which further comprises a unit for nitrogen oxide adsorptive catalyst that is disposed between the second plasma unit and the catalyst unit.

The system described above is able to temporarily adsorb $NO_x$ with the $NO_x$ adsorptive catalyst when it is not possible to properly decompose $NO_x$ due to low activity of the catalyst for selective reduction of $NO_x$.

It is a yet further aspect of the present invention to provide a system for purifying an exhaust gas, which further comprises a temperature sensor. The system activates the second plasma unit when a temperature of the catalyst for selective reduction of nitrogen oxides detected by the temperature sensor is not less than a predetermined active temperature.

The system described above is able to selectively activate the second plasma unit when the catalyst for selective reduction of $NO_x$ is active, which provides better power management for the second plasma unit.

It is another aspect of the present invention to provide a system for purifying an exhaust gas, which further comprises a unit for adding reductant. This unit is disposed upstream relative to the catalyst unit in the direction of flow of the exhaust gas. The unit adds a reductant to the exhaust gas when the temperature of the catalyst for selective reduction of nitrogen oxides is not less than the predetermined active temperature.

The system described above is able to add the reductant without its wasteful consumption.

When the unit for adding reductant is so arranged that it is able to add the reductant upstream the second plasma unit and HC is selected for the reductant, second energetic plasma species react with HC to form reactive materials such as aldehyde and hydrocarbon containing nitrogen oxide. Because these materials efficiently decompose $NO_x$ with the catalyst for selective reduction of $NO_x$, it is possible to provide better purification of an exhaust gas.

It is still another aspect of the present invention to provide a system for purifying an exhaust gas, which further comprises an oxidation catalyst unit downstream relative to the catalyst unit in the direction of flow of the exhaust gas.

The system described above is able to develop purification with addition of oxidation, introducing the oxidation catalyst.

It is yet another aspect of the present invention to provide a method for sequentially purifying an exhaust gas including particulate matters and nitrogen oxides. The method comprises following two steps: (1) generating energetic plasma species which react with the particulate matters and the nitrogen oxides and (2) purifying the exhaust gas with a catalyst.

The method described above allows the energetic plasma species to react with the particulate matters, so that the exhaust gas is purified. At the same time, the energetic plasma species also react with $NO_x$ to form $NO_2$, which experiences reduction by the catalyst in step (2). In this way, the method provides sequential purification of particulate matters and $NO_x$.

It is a further aspect of the present invention to provide a method for purifying an exhaust gas, in which step (1) further comprises following steps: generating first energetic plasma species which principally react with the particulate matters and generating second energetic plasma species which principally react with the nitrogen oxides.

The method described above, which has steps generating the first and second energetic plasma species, is able to provide purification of particulate matters and production of reactive materials such as $NO_2$.

BRIEF DESCRIPTION OF THE DRAWINGS

FIG. 7 is a table summarizing characteristics of a diesel engine used for testing.

FIG. 8 is a table showing gas concentration.

FIG. 9 is a table summarizing conditions of first and second plasma units for examples 1, 2 and 3.

DESCRIPTION OF THE PREFERRED EMBODIMENTS

An embodiment of the present invention is now described with reference to FIGS. 1 and 2.

a. System for Purifying an Exhaust Gas

Figure 1:
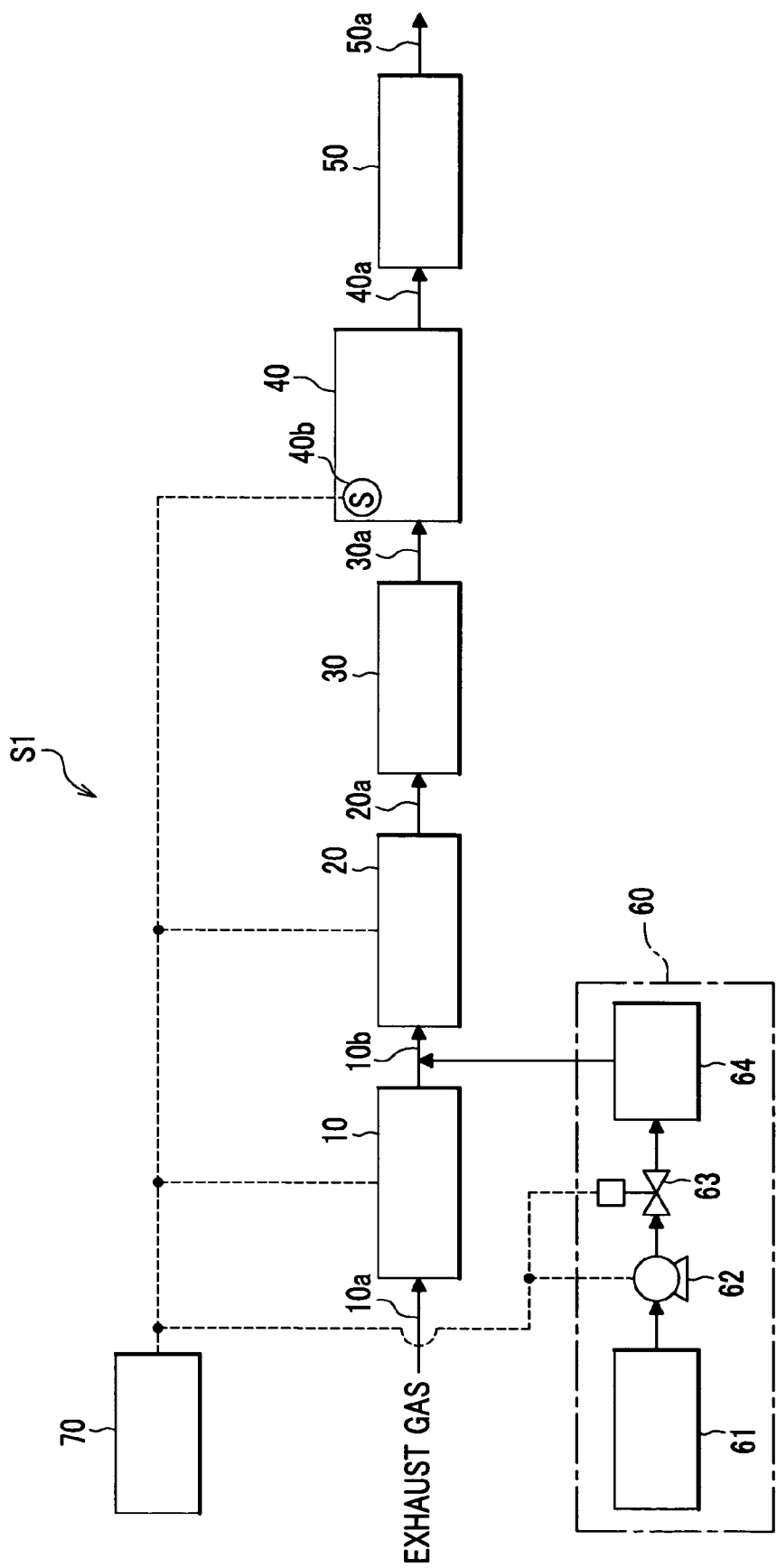
FIG. 1 is a block diagram schematically illustrating a system for purifying an exhaust gas according to the present invention.

As shown in FIG. 1, a system S1 for purifying an exhaust gas, which is mounted on an automobile having an engine (internal combustion engine), provides sequential purification for particulate matters (PM) and nitrogen oxides ($NO_x$) contained in an exhaust gas discharged from the engine.

Hereinafter upstream is meant to represent a direction from which an exhaust gas comes and downstream is the opposite direction to which the exhaust gas flows.

The system S1 includes, as seen from upstream to downstream, a first plasma unit 10, a second plasma unit 20, a unit 30 for $NO_x$ adsorptive catalyst, a unit 40 for catalyst for selective reduction of $NO_x$ and an oxidation catalyst unit 50. Furthermore, the system S1 includes a unit 60 for adding reductant and an electronic control unit 70 (hereinafter referred to as "ECU"). The unit 60 adds hydrocarbons (HC) as a reductant to an exhaust gas between the first and second plasma units 10 and 20.

First Plasma Unit

The first plasma unit 10 is connected to the downstream of a pipe 10a, through which the exhaust gas passes. The plasma unit 10 is electrically connected to the ECU 70, which controls the plasma unit 10.

The first plasma unit 10, which has electrodes for generating plasma, generates first energetic plasma species such as oxygen (O) energetic species, hydroxide (OH) energetic species and perhydroxide (OOH) energetic species. Generation of energetic plasma species proceeds in the following manner. When a voltage is imposed on spaced electrodes, plasma is generated. As a result, electrons emitted from the electrodes impinge on molecules contained in an exhaust gas, generating the first energetic plasma species. Because the first energetic plasma species have a high capability in oxidation, their contact with PM contained in the exhaust gas leads to oxidation, resulting purification of PM. In this connection, the method for generating plasma is not limited in the present embodiment and such methods may be adopted as corona discharging, pulse discharging and barrier discharging.

It is selected that the power density of first plasma unit 10 is not less than $0.8$ $W/cm^3$. The reason for setting this value is that an example to be described later has demonstrated that more than 80% of PM is successfully purified (see FIG. 5).

Figure 4:
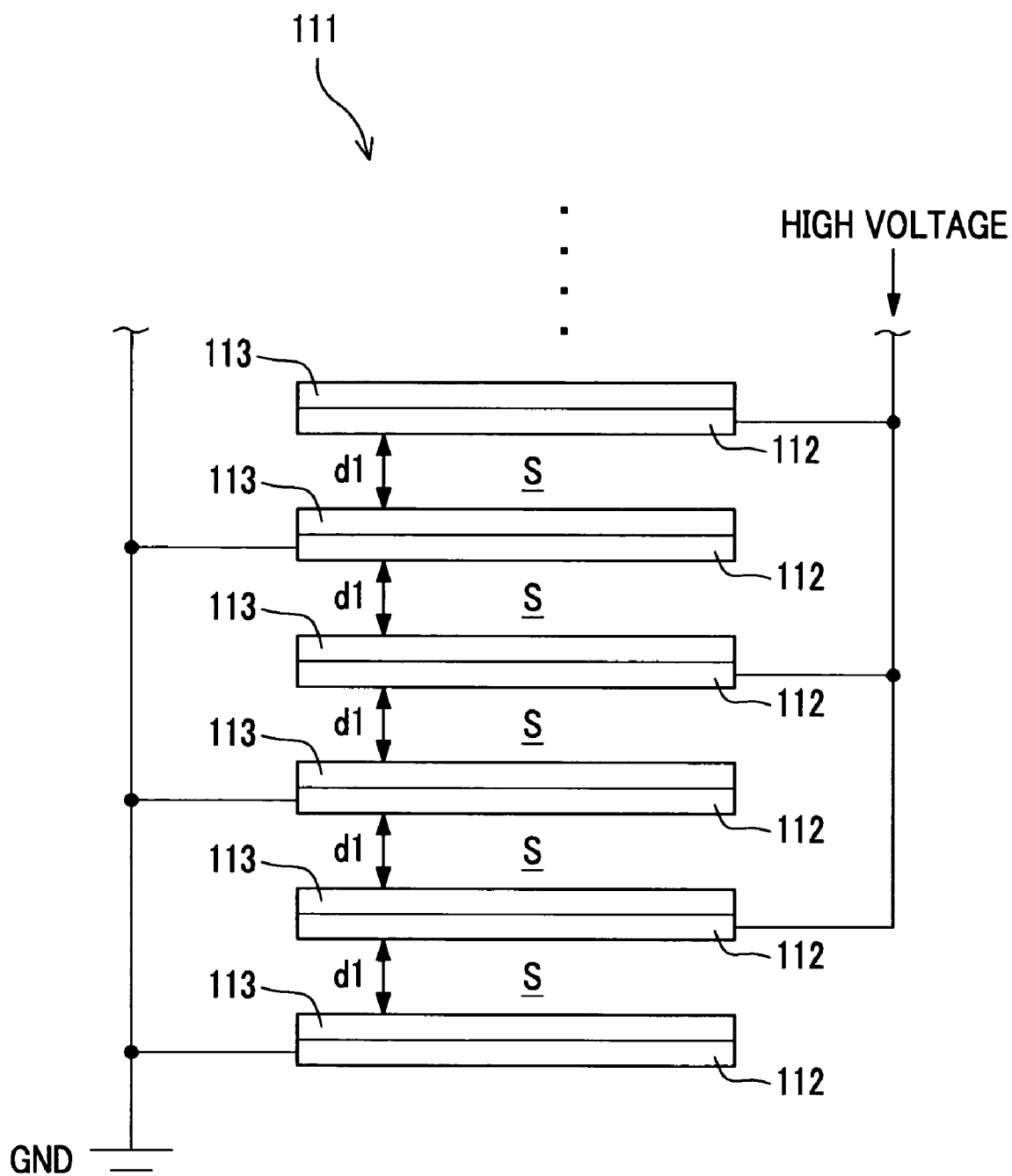
FIG. 4 is a sectional view partially showing a first plasma assembly disposed in a first plasma unit shown in FIG. 3.

Power density of plasma space is meant to represent a value, which is calculated by dividing power consumed for generation of plasma by the volume of space where the plasma occupies. When electrodes 112 are disposed in parallel with each other by spacing them regularly, as shown in FIG. 4 illustrating an example to be described later, a plasma space S corresponds to a volume defined by a pair of neighboring electrodes 112. The higher is power density of plasma space, the higher energy possess electrons existing in plasma, which means it is possible to efficiently generate the first energetic plasma species.

Second Plasma Unit

The second plasma unit 20 is connected after the first plasma unit 10 via a pipe 10b. The second plasma unit 20 is electrically connected to the ECU 70, which controls the second plasma unit 20.

The second plasma unit 20 generates second energetic plasma species such as oxygen (O) energetic species, hydroxide (OH) energetic species, perhydroxide (OOH) energetic species and $NO_x$ energetic species, which principally react with $NO_x$ in the exhaust gas and HC added by the unit 60 for adding reductant. Among these second energetic plasma species, O energetic species reacts with oxygen ($O_2$) to form ozone ($O_3$). This ozone immediately reacts with $NO_x$ contained in an exhaust gas, generating $NO_2$. Also, the ozone reacts with HC, generating aldehyde species such as acetaldehyde ($CH_3CHO$), and reacts with $NO_x$ energetic species contained in plasma, generating hydrocarbon containing nitrogen oxide.

It is selected that the spatial power density of second plasma unit 20 is from $0.4$ to $9.5$ $W/cm^3$. The reason for setting this value is that an example to be described later has demonstrated that generation of $NO_2$ is not less than 80% (see FIG. 5), which results from reaction of the second energetic plasma species with $NO_x$.

The system S1 for purifying an exhaust gas according to the present embodiment, which has the first and second plasma units 10 and 20, is able to independently control these units 10 and 20. In this way, the first plasma unit 10 is responsible for purification of PM and the second plasma unit 20 is responsible for generating highly reactive $NO_2$ and the like.

Unit for $NO_x$ Adsorptive Catalyst

The unit 30 for $NO_x$ adsorptive catalyst is connected after the second plasma unit 20 via a pipe 20a. The unit 30 has a $NO_x$ adsorptive catalyst, which has characteristics that when the temperature of an exhaust gas is not more than a certain temperature (active temperature of catalyst for selective reduction of $NO_x$), it temporarily adsorbs $NO_x$, and when the temperature of exhaust gas is more than the certain temperature, it releases the adsorbed $NO_x$.

Figure 2:
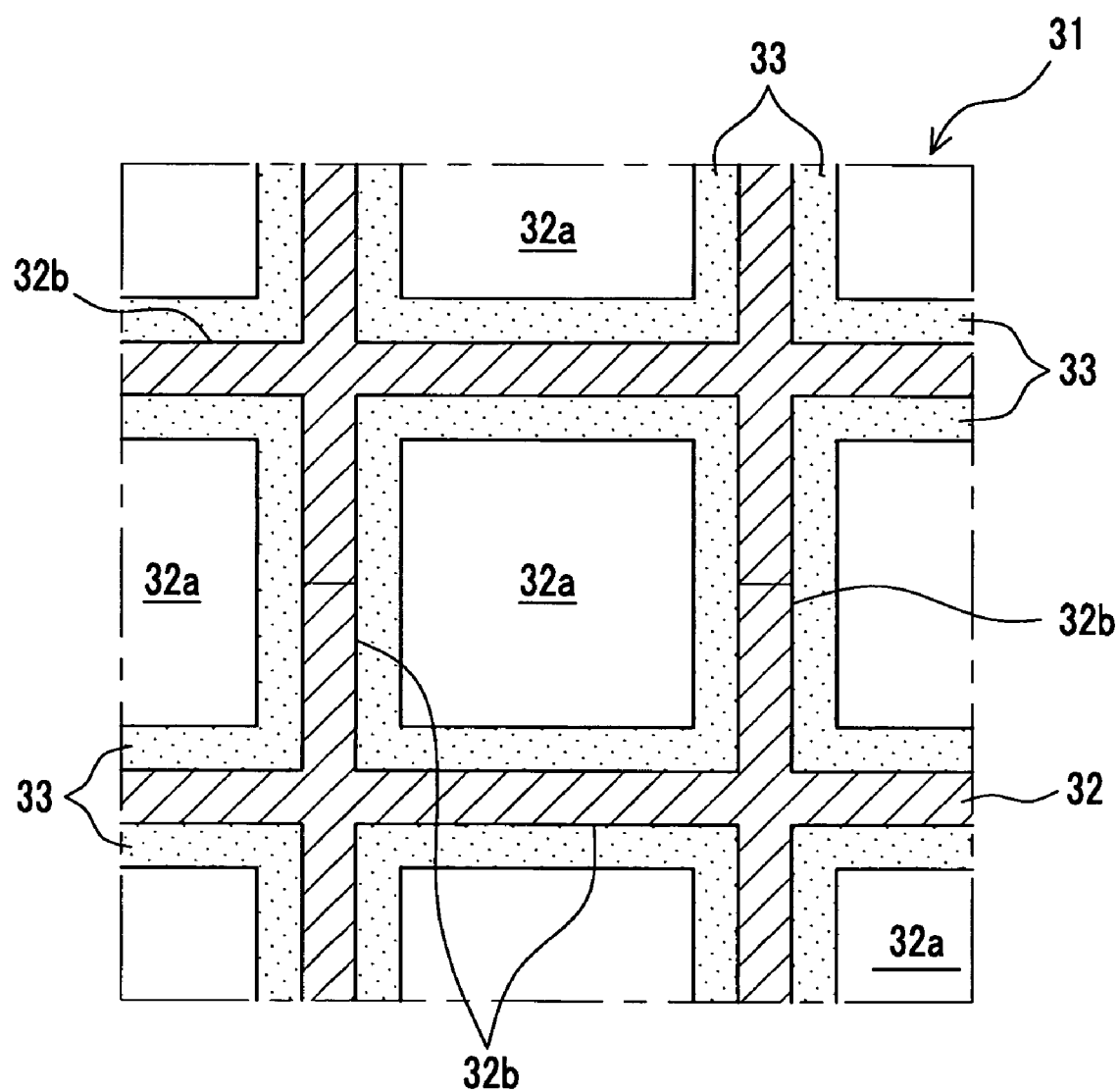
FIG. 2 is a sectional view partially showing a catalyst assembly disposed in a $NO_x$ adsorptive catalyst unit shown in FIG. 1.

As shown in FIG. 2, the Unit 30 for $NO_x$ adsorptive catalyst has a catalyst assembly 31 including a support 32, which has plurality of fine holes 32a, through which an exhaust gas passes. The catalyst assembly 31 has a $NO_x$ adsorptive catalyst 33 of layered structure, which covers the support 32 and inner surfaces 32b surrounding the fine holes 32a. Because the $NO_x$ adsorptive catalyst 33 is manufactured by impregnation of the support 32 with $NO_x$ adsorptive slurry, it is called washcoat (layer).

Although the shape of support 32 is not limited as long as it provides space through which an exhaust gas passes, the present invention uses a shape similar to a honeycomb having the plural fine holes 32a, taking into account a contact area with an exhaust gas and mechanical strength. It is preferable but not necessarily required that heat-resistant material is used for a support 32. For example, it is possible to name porous substrates (ceramics) such as cordierite, mullite and silicone carbide (SiC), or metal such as stainless steel.

As an example of material for catalytic activity, it is possible to use a porous substrate which supports alkaline metal or alkaline earth metal, for example. It is possible to name alumina, silica, silica alumina and zeolite as material for porous substrate, for example.

Unit for Catalyst for Selective Reduction of $NO_x$

The unit 40 for catalyst for selective reduction of $NO_x$, which is connected after the unit 30 for $NO_x$ adsorptive catalyst via a pipe 30a, has a catalyst for selective reduction of $NO_x$ (catalyst for purification of an exhaust gas).

The unit 40, which has the similar structure as that of the unit 30, includes a catalyst assembly of honeycomb-like shape. This catalyst assembly has the catalyst for selective reduction of $NO_x$ instead of the $NO_x$ adsorptive catalyst. As an example of material for catalytic activity, it is possible to use a porous substrate supporting silver (Ag). As an example of porous substrate, it is possible to name alumina, silica, silica alumina and zeolite. In this connection, it may be alternatively possible to use a substrate supporting zeolite (Mordenite, for example) having acidity, instead of silver.

The unit 40 has the temperature sensor 40b, which detects the temperature of catalyst for selective reduction of $NO_x$ and is electrically connected to the ECU 70. In this way, the ECU monitors this temperature so as to observe a condition in activation of the catalyst.

Oxidation Catalyst Unit

The oxidation catalyst unit 50, which is connected after the unit 40 for catalyst for selective reduction of $NO_x$ via a pipe 40a, has an oxidation catalyst which provides supplementary purification for an exhaust gas by oxidation. A pipe for discharging the exhaust gas is disposed downstream the unit 50.

The unit 50, which has the similar structure of that of the unit 30 for $NO_x$ adsorptive catalyst, includes a catalyst assembly of a honeycomb-like shape. This catalyst assembly has the oxidation catalyst instead of the $NO_x$ adsorptive catalyst. As an example of material for catalytic activity, it is possible to use alumina supporting platinum (Pt).

Unit for Adding Reductant

The unit 60 for adding reductant adds HC to an exhaust gas as a reductant in the immediate upstream of the second plasma unit 20. In the present embodiment, a fuel such as light oil and gasoline is used, for example. As seen from upstream to downstream, the unit 60 includes a fuel tank 61, a fuel pump 62, a regulating valve 63, a carburetor 64 and a pipe connecting these components. The fuel pump 62 and the regulating valve 63 are electrically connected to the ECU 70, which controls these two components 62 and 63. The carburetor 64, which is heated by an exhaust gas, evaporates a fuel. The ECU 70 controls the fuel pump 62 and a valve position of the fuel pump 63, thereby adding a predetermined amount of HC to the exhaust gas.

Electronic Control Unit (ECU)

The ECU 70, which serves as a central control unit for the system S1 for purifying an exhaust gas, includes CPU, ROM and input/output interfaces. The ECU 70 is electrically connected to the first plasma unit 10, second plasma unit 20, temperature sensor 40b, fuel pump 62 and regulating valve 63. Detailed description will be given of the ECU 70 later in discussion of operation of the system S1.

b. Operation of System for Purifying an Exhaust Gas

Description is given of a method along with operation of a system S1 for purifying an exhaust gas with reference to FIG. 1.

An exhaust gas discharged from an engine (not shown) is guided into the system S1 from upstream via a pipe 10a. As the exhaust gas enters the system S1, an ECU 70 controls a first plasma unit 10 at a power density of plasma space not less than 0.8 W/cm$^3$. As a result, first energetic plasma species, such as oxygen energetic species, hydroxide energetic species and perhydroxide energetic species, are generated in the first plasma unit 10. These plasma energetic species, especially oxygen energetic species, react with PM contained in the exhaust gas, thereby purifying PM by oxidation.

The ECU 70 controls a fuel pump 62 and a regulating valve 63 so as to add a predetermined amount of HC to the exhaust gas. When the temperature of a catalyst for selective reduction of $NO_x$ detected by a temperature sensor 40b is less than its active temperature, the ECU 70 does not permit addition of HC. This provides protection against wasteful addition of HC, preventing worsening of fuel consumption.

The ECU 70 controls a second plasma unit 20 at a power density of plasma space from 0.4 to 9.5 W/cm$^3$. In the second plasma unit 20, second energetic plasma species are generated, such as oxygen energetic species, hydroxide energetic species, perhydroxide energetic species and $NO_x$ energetic species.

Among these species the oxygen energetic species react oxygen (O) to form ozone ($O_3$). This ozone immediately reacts with $NO_x$ contained in the exhaust gas, generating $NO_2$. Also, this ozone reacts not only with added HC, generating aldehyde species such as acetaldehyde ($CH_3CHO$) and the like, but also with $NO_x$ energetic species, generating hydrocarbon containing nitrogen oxide.

When the temperature of a catalyst for selective reduction of $NO_x$ detected by the temperature sensor 40b is less than its active temperature due to the exhaust gas having low temperature in such a situation as right after starting of an engine, the ECU 70 does not allow the second plasma unit 20 to operate. This leads to a reduction in power consumption.

Simultaneously, a unit 30 for $NO_x$ adsorptive catalyst temporarily adsorbs $NO_x$ contained in the exhaust gas.

When this temperature of catalyst rises as the temperature of exhaust gas increases and the catalyst for selective reduction of $NO_x$ has desirable catalytic activity, the unit 30 releases the adsorbed $NO_x$.

In a unit 40 for catalyst for selective reduction of $NO_x$, a reductive reaction of $NO_2$ by aldehyde species and hydrocarbons containing nitrogen oxide occurs on a catalyst for selective reduction of $NO_x$. With heat generated by this reaction, other reactions also develop for NO and other HC species contained in the exhaust gas. In this way, it is possible to provide efficient purification of $NO_x$, over a temperature range including low temperature.

Subsequently, an oxidation catalyst unit 50 provides supplemental purification by oxidation to the exhaust gas, which is discharged via a pipe 50a into an external environment.

The system S1 for purifying an exhaust gas according to the present invention is able to sequentially purify PM and $NO_x$ contained in an exhaust gas.

While the invention has been described in detail and with reference to a specific embodiment thereof, it will be apparent to one skilled in the art that various changes and modifications can be made therein without departing from the spirit and scope thereof. Following are examples for the modifications.

In the embodiment described above, it has been assumed that a system S1 for purifying an exhaust gas is used for PM and $NO_x$ discharged from an automobile as an example. Application of the system S1 is not limited to this example, but it is possible to apply it to purification of PM and $NO_x$ contained in smoke and soot discharged from a factory.

Though the system S1 described above has independent first and second plasma units 10 and 20, it may be alternatively possible to adopt one combined unit, in place of these two units.

It may also be possible to adopt an arrangement in one plasma unit so that first energetic plasma species are generated greater in the upstream and second energetic plasma species are generated greater in the downstream. This arrangement is implemented by gradual setting of the number of electrodes generating plasma, their spacing and voltage imposed on them, from upstream to downstream relative to a direction of flow of exhaust gas.

c. Example

Description in more detail is given of the present invention with reference to examples.

(1) System for Purifying an Exhaust Gas (1-1) Structure

Figure 3:
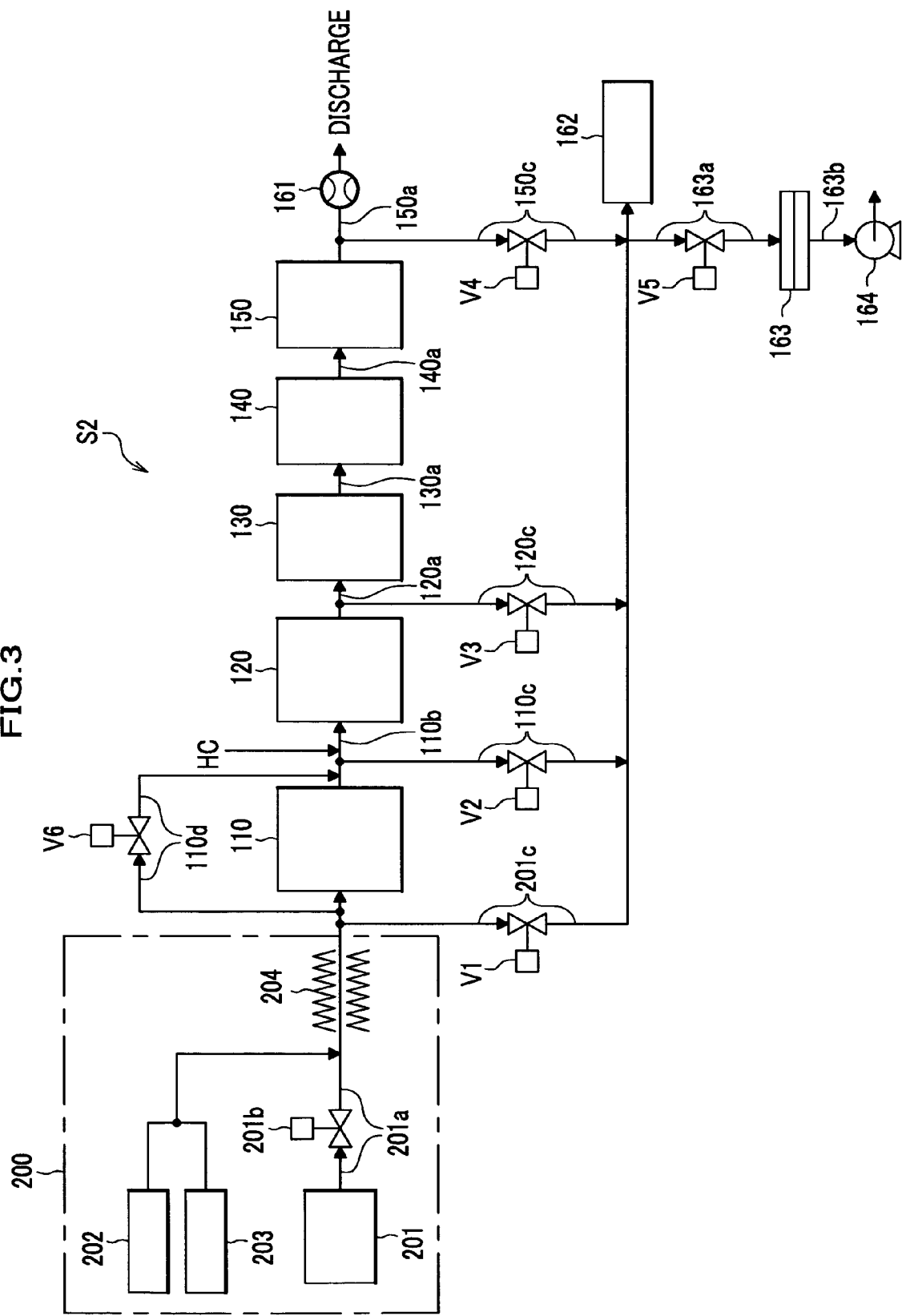
FIG. 3 is a block diagram schematically illustrating an example of system for purifying an exhaust gas according to the present invention.

Description is given of the structure of a system S2 for purifying an exhaust gas with reference to FIG. 3.

The system S2, which purifies an exhaust gas generated at an exhaust gas section 200, includes, from upstream to downstream, a first plasma unit 110, a second plasma unit 120, unit 130 for $NO_x$ adsorptive catalyst, a unit 140 for catalyst for selective reduction of $NO_x$, an oxidation catalyst unit 150 and a flow meter 161 located at the utmost downstream for measuring an amount of the exhaust gas. In addition, the system S2 has pipes 110b, 120a, 130a, 140a and 150a by which the components described above have fluid communication. A unit for adding reductant (not shown) provides an exhaust gas with hydrocarbon HC (reductant) between the first plasma unit 110 and the second plasma unit 120. In this example, normal decane (n-$C_{10}H_{22}$)

was used for HC. There is a pipe 110d having a valve V6, which bypasses the first plasma unit 110.

(1-2) Plasma Unit

Description is given of the first and second plasma units 110 and 120.

The first plasma unit 110 internally has a first plasma generator 111, shown in FIG. 4.

The plasma generator 111 has a plurality of metallic electrodes 112, each of which has a surface covered with a dielectric substance 113. These electrodes 112 are spaced with a predetermined distance d1 in a definite direction so that a metallic surface confronts a dielectric surface. The electrodes 112 are alternately connected to a high voltage terminal and a ground. In this way, the plasma generator 111 provides a plasma space S where plasma is generated. Each of the electrodes 112 is a plate of 20 mm×50 mm×1 mm (thickness) made of SUS316. The dielectric substance is made of alumina ($Al_2O_3$) having a thickness of 0.5 mm. The electrodes 112 are arranged so that the distance d1 described above is 0.5 mm and the number of plasma spaces S amounts to 10 layers. As a result, the volume of one layer of plasma space S is 0.5 $cm^3$ and a total of 5.0 $cm^3$ (see FIG. 7).

The second plasma unit 120, which has the similar structure as that of the first plasma unit 110, has three layers of space S with a distance d1 of 1.5 mm. As a result, the volume of one layer of the space S results in 1.5 $cm^3$ and a total volume 4.5 $cm^3$ (see FIG. 7).

(1-3) Exhaust Gas Section

Returning to FIG. 3, description is given of the exhaust gas section 200.

The exhaust gas section 200 includes a diesel engine 201 having features shown in FIG. 7, an $N_2$ tank 202 storing highly pressurized nitrogen, an $O_2$ tank 203 storing highly pressurized oxygen and a heater 204. The diesel engine 201 is connected to the first plasma unit 110 via a pipe 201a having a regulating valve 201b. The $N_2$ tank 202 and the $O_2$ tank 203 are connected to the pipe 201a downstream the regulating valve 201b so that nitrogen and oxygen gasses are added to an exhaust gas generated by the diesel engine 201. The heater 204 is disposed in the vicinity of the pipe 201a so that an exhaust gas to be brought into the system S2 is heated up to a predetermined temperature.

In the example, nitrogen and oxygen were added so that an exhaust gas had a gas composition shown in FIG. 8. The concentrations shown in FIG. 8 are for conditions that the temperature of an exhaust gas is 25 degrees Celsius and its pressure is 1013 hPa (standard atmospheric pressure).

(1-4) Gas Analyzing Section

A pipe 201c having a valve V1 diverges from the pipe 201a downstream relative to the heater 204. The pipe 201c is connected to a gas analyzer 162 (HORIBA MEXA-4300FT). In this way, it is possible to analyze the composition of an exhaust gas which is introduced into the first plasma unit 110 by controlling opening and closing of the valve V1. In this connection, the concentration of $NO_x$ was calculated as a summation of NO and $NO_2$.

Pipes 110c, 120c and 150c diverge from pipes in the following manner. The pipe 110c having a valve V2 has a junction with the pipe 110b which connects the first and second plasma units 110 and 120. The pipe 120c having a valve V3 has a junction with the pipe 120a which connects the second plasma unit 120 and the unit 130 for $NO_x$ adsorptive catalyst. The pipe 150c having a valve V4 has a junction with the pipe 150a which connects the oxidation catalyst unit 150 and the flow meter 161. These pipes 110c, 120c and 150c join the pipe 201c downstream. In this way, it is possible to analyze the composition of an exhaust gas by the gas analyzer 162, which is sampled at a selected location, by controlling opening and closing of each of the valves V2, V3 and V4.

Furthermore, a pipe 163a having a valve V5 diverges from the pipe 201c. Downstream this pipe 163a are connected a filter 163, a pipe 163b and a vacuum pump 164 in that order. When the valve V5 is opened and the vacuum pump 164 is turned on, it sucks a gas passing through the pipe 201c so that the filter 163 captures PM contained in this gas. It is possible to measure the mass of PM in the exhaust gas by mass method which utilizes a difference in mass before and after capturing of PM. In this connection, a filter with 0.3 micron meters mesh was used as an example.

(1-5) Manufacturing of Catalyst Units

Description is given of manufacturing of catalyst assemblies which are included in a unit 130 for $NO_x$ adsorptive catalyst, a unit 140 for catalyst for selective reduction of $NO_x$ and an oxidation catalyst unit 150, respectively.

(1-5-1) $NO_x$ Adsorptive Catalyst Assembly

Cs-USY type zeolite catalyst powder was selected for a $NO_x$ adsorptive catalyst. The method for its preparation is described below.

One hundred grams of Na-USY zeolite powder, 257 g of cesium nitrate and 1000 g of ion-exchange water, which were in a separable flask, were heated at 90 degrees Celsius for 14 hours with stirring. They underwent filtration and subsequent washing with pure water. They were dried not only in a drying furnace at 150 degrees Celsius for two hours, but also in a muffle furnace at 400 degrees Celsius for 12 hours. In this way, Cs ion exchange USY type zeolite catalyst powder ($NO_x$ adsorptive catalyst powder) was obtained.

After 90 g of this powder, 50 g of $Al_2O_3$ binder (20 weight percent $Al_2O_3$) and 150 g of ion-exchange water were mixed in a vessel, they underwent wet grinding in an alumina ball for 12 hours, thereby forming slurry of Cs ion exchange USY type zeolite catalyst ($NO_x$ adsorptive catalyst slurry).

A honeycomb support with a diameter of 25.4 mm and length of 60 mm made of cordierite, which has a porous density of 62cells/$cm^2$ (400cells/$inch^2$) and a diameter of hole of 152.4 micron meters (6 mils), was immersed in the slurry described above.

The honeycomb support was then taken out of the slurry and removed excessive slurry attached to it by air spray, being baked at 150 degrees Celsius for one hour. The steps described above were repeated until the honeycomb support had supported a target amount of the slurry. Subsequently, the honeycomb support was baked at 500 degrees Celsius in a muffle furnace for two hours.

An amount of $NO_x$ adsorptive catalyst formed by a washcoat method was 100 g/L, which represents the mass of catalyst per unit volume of hole.

(1-5-2) Catalyst Assembly for Selective Reduction of $NO_x$

Alumina supporting silver (Ag) was selected for a catalyst for selective reduction of NOx. The method for its preparation is described below.

After 4.72 g of silver nitrate ($AgNO_3$), 97 g of $\gamma$—$Al_2O_3$ and 1000 g of ion-exchange water, which were mixed in an eggplant flask, they were removed excessive water by a rotary evaporator. They were dried at 200 degrees Celsius in a drying furnace for two hours and furthermore at 600 degrees Celsius in a muffle furnace for two hours, thereby forming alumina powder supporting Ag.

After 90 g of this powder, 50 g of $\gamma$—$Al_2O_3$ (20 weight percent $Al_2O_3$) and 150 g of ion-exchange water were mixed in a vessel, they were subjected to wet grinding in an alumina ball for 12 hours, forming slurry of alumina catalyst supporting Ag.

A honeycomb support with a diameter of 25.4 mm and length of 60 mm made of cordierite, which has a porous density of 62cells/cm² (400cells/inch²) and a diameter of hole of 152.4 micron meters (6 mils), was immersed in the slurry described above.

The honeycomb support was then taken out of the slurry and removed excessive slurry attached to it by air spray, being baked at 150 degrees Celsius for one hour. The steps described above were repeated until the honeycomb support had supported a target amount of the slurry. Subsequently, the honeycomb support was baked at 500 degrees Celsius in a muffle furnace for two hours.

An amount of catalyst for selective reduction of $NO_x$ formed by a washcoat method was 200 g/L, which represents the mass of catalyst per unit volume of hole. And an amount of supported Ag was 3 g/L.

(1-5-3) Oxidation Catalyst Assembly

Alumina carrying platinum (Pt) was selected for an oxidation catalyst. The method for its preparation is described below.

After 80 g of dinitro amine platinum nitrate solution ($Pt(NH_3)_2(NO_2)$—$HNO_3$) which contains 5 weight percent of platinum (Pt), 96 g of $\gamma$—$Al_2O_3$ and 1000 g of ion-exchange water were mixed in a eggplant flask, they were removed excessive water by a rotary evaporator. They were dried at 200 degrees Celsius in a drying furnace for two hours and furthermore at 600 degrees Celsius in a muffle furnace for two hours, thereby forming alumina powder supporting Pt.

After 90 g of this powder, 50 g of $SiO_2$ binder (20 weight percent SiO2) and 150 g of ion-exchange water were mixed in a vessel, they were subjected to wet grinding in an alumina ball for 12 hours, forming slurry of alumina catalyst supporting Pt.

A honeycomb support similar to that used for the $NO_x$ adsorptive catalyst assembly described above was immersed in the slurry described above. The honeycomb support was then taken out of the slurry and removed excessive slurry attached to it by air spray, being baked at 150 degrees Celsius for one hour. The steps described above were repeated until the honeycomb support had supported a target amount of the slurry. Subsequently, the honeycomb support was baked at 500 degrees Celsius in a muffle furnace for two hours.

An amount of oxidation catalyst formed by a washcoat method was 100 g/L, which represents the mass of catalyst per unit volume of hole. And an amount of supported Pt was 4 g/L.

(2) Power Density of Plasma Space

Testing was conducted for the first and second plasma units 110 and 120 of system S2 for purifying an exhaust gas so as to verify a power density of plasma space.

(2-1) First Plasma Unit

A percentage for purification of PM was calculated with an expression (1) for power density of plasma space of the first plasma unit 110 based on measurement data.

$$\alpha = \frac{m1 - m2}{m1} \times 100 \quad (1)$$

where $\alpha$ represents rate for purification of PM in the form of percentage, m1 represents mass of PM contained in a gas which is brought into a system for purifying an exhaust gas and m2 represents mass of PM contained in a gas which is discharged from the system.

Figure 5:
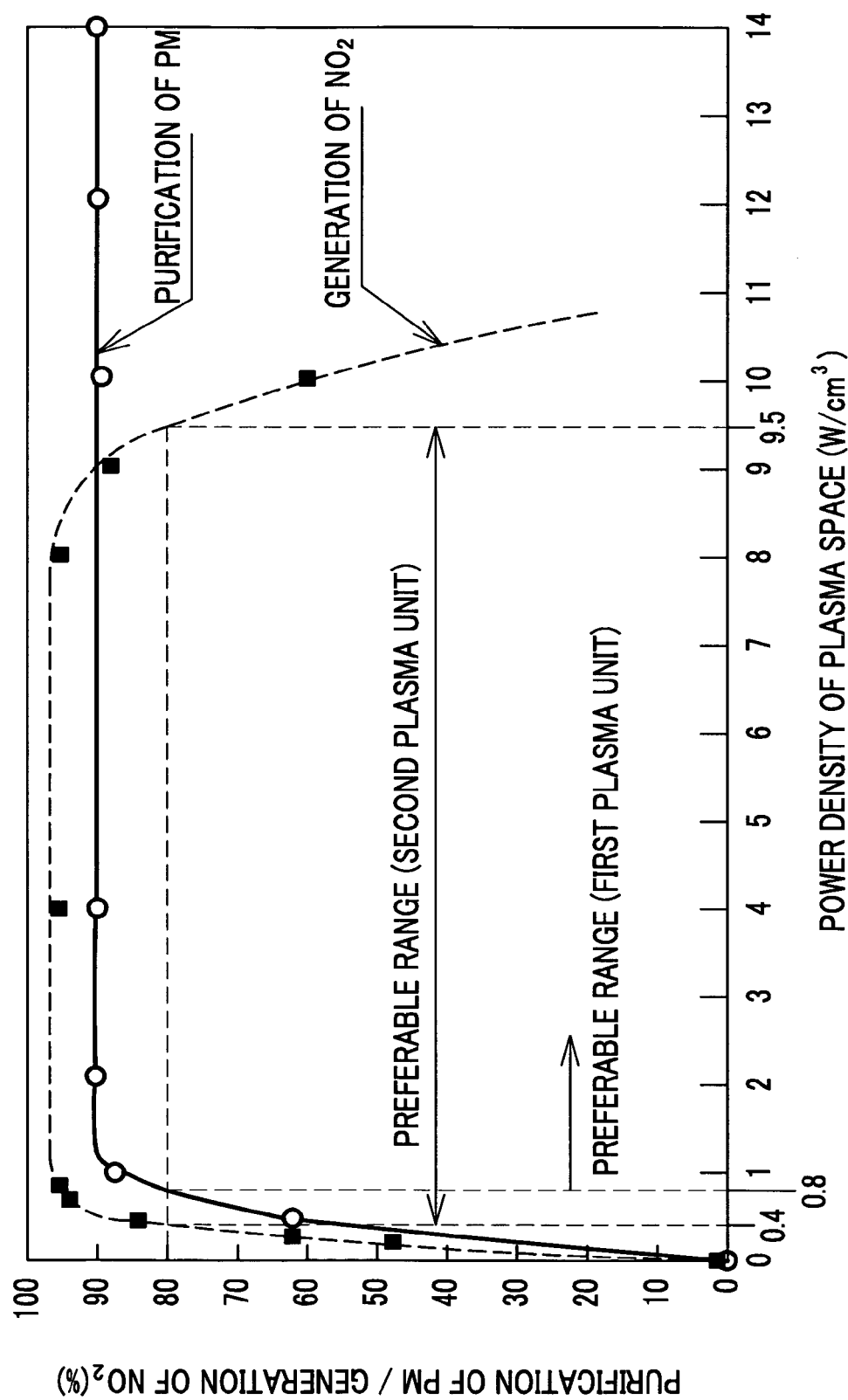
FIG. 5 is a graph depicting test results of first and second plasma units for power density of plasma space.

Measurement was made for an exhaust gas which was guided into the system S2, where the first plasma unit 110, the unit 130 for $NO_x$ adsorptive catalyst, the unit 140 for catalyst for selective reduction of $NO_x$ and the oxidation catalyst unit 150 were in operation. While testing was being conducted, the valves V1, V4 and V5 were controlled as required. Measurement was repeated for varied power density of plasma space. FIG. 5 summarizes test results. In this test configuration, the second plasma unit 120 was not brought to operation.

As seen from FIG. 5, it was demonstrated that it is possible to provide efficient purification of PM contained in an exhaust gas, which achieves a rate for purification not less than 80%, when power density of plasma space is not less than 0.8 (W/cm³), which is referred to as preferable range.

(2-2) Second Plasma Unit

Next, an exhaust gas was guided into the second plasma unit 120 by bypassing the first plasma unit 110 by opening the valve V6. Measurement was conducted for the gas while the valve V3 was left open. A rate for generation of $NO_2$ was calculated with an expression (2). This rate represents percentage of generated $NO_2$ relative to total $NO_x$ contained in the gas, which is assumed to be a summation of NO and $NO_2$ as described above. Test results are shown in FIG. 5.

$$\beta = \frac{m4}{m3} \times 100 \quad (2)$$

where $\beta$ represents rate for generation of $NO_2$ in the form of percentage, m3 represents an amount of $NO_x$ contained in a gas which is discharged from a second plasma unit and m4 represents an amount of $NO_2$ contained in the same gas.

As seen from FIG. 5, it was demonstrated that it is possible to provide desirable generation of reactive $NO_2$ in the second plasma unit 120 due to plasma reacting with $NO_x$, which achieves a rate for generation not less than 80%, when power density of plasma space is from 0.4 to 9.5 (W/cm³), which is referred to as preferable range.

(3) Comparison (3-1) Example 1

Taking into account the power density of plasma space described above, 6.0 and 2.2 (W/cm³) were selected for the first and second plasma units 110 and 120, respectively, in an example 1. In setting these values, sinusoidal alternating current of 600 Hz was imposed on the first plasma unit 110 at AC voltage of 6.6 kVpp and resulting current of 15 $mA_{rms}$ was observed. For the second plasma unit 120, AC current of 800 Hz was imposed at 9.2 $kV_{pp}$ and current of 5.3 $mA_{rms}$ was observed.

An exhaust gas, which was discharged from a diesel engine whose characteristics are shown in FIG. 7, was brought into the system S2 for purifying an exhaust gas. Measurement was conducted for acquiring data to be used for calculation of rates for purification of PM and $NO_x$ based on expressions (1) and (3), while opening and closing of the valves V1, V4 and V5 were selectively controlled.

$$\gamma = \frac{m5 - m6}{m5} \times 100 \quad (3)$$

where $\gamma$ represents a rate for purification of $NO_x$ in the form of percentage, m5 represents an amount of $NO_x$ contained in a gas brought into a system for purifying an exhaust gas and m6 represents an amount of $NO_x$ contained in a gas discharged from the same system.

Figure 6:
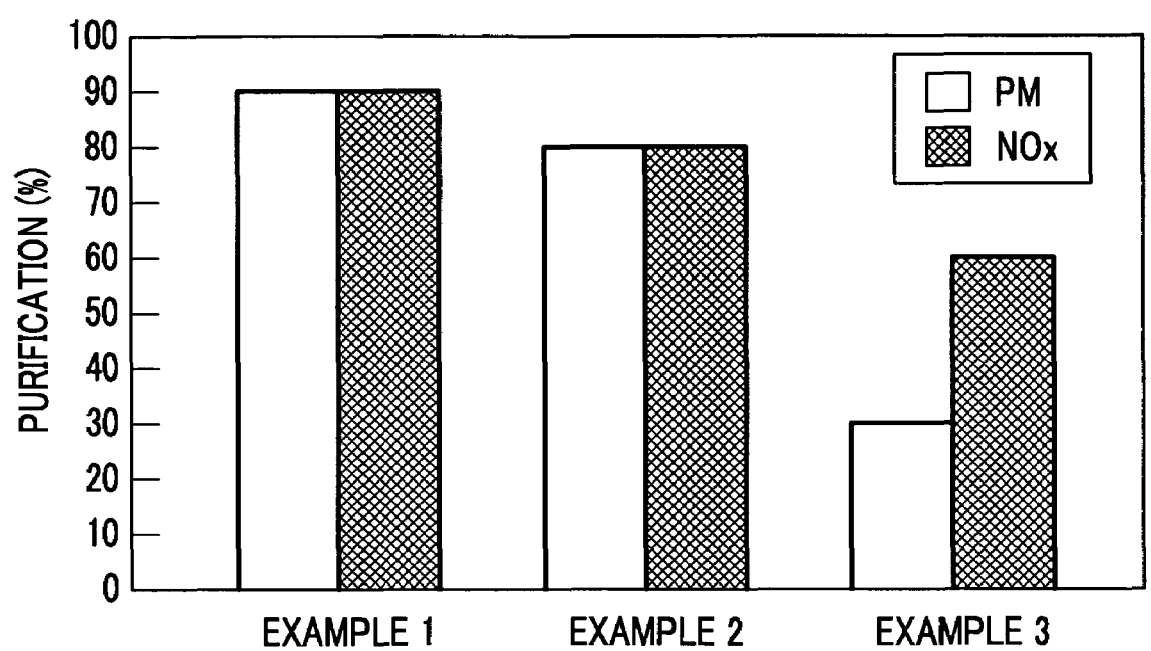
FIG. 6 is a graph showing rates for purification of PM and $NO_x$ achieved by examples of system for purifying an exhaust gas.

An exhaust gas having temperature of 300 degrees Celsius was brought in at a flow rate of 15 L/min. The amount of addition of HC ($n-C_{10}H_{22}$) was determined to be 3000 ppmC. When the temperature of a catalyst for selective reduction of $NO_x$ in the unit 140 had exceeded 200 degrees Celsius, addition of HC was conducted and the second plasma unit 120 was brought to operation. Results of measurement are shown in FIG. 6.

(3-2) Example 2

Power densities of plasma space of 8.0 and 2.2 (W/cm$^3$) were selected for the first and second plasma units 110 and 120, respectively, in an example 2. In setting these values, sinusoidal alternating current of 3000 Hz was imposed on the first plasma unit 110 at AC voltage of 7.0 kVpp and resulting current of 30 mA$_{rms}$ was observed. The same conditions as those of the example 1 were selected for the second plasma unit 120.

Measurement was conducted for rates for purification of PM and $NO_x$ in the same manner as those of the example 1. Results of measurement are shown in FIG. 6.

(3-3) Example 3

An example 3 provides a case to be compared with the examples 1 and 2, where the first and second plasma units 110 and 120 were not brought to operation and addition of HC was not carried out in the system S2 for purifying an exhaust gas. Results of measurement are shown in FIG. 6.

Conditions of the first and second plasma unit 110 and 120 for the examples 1, 2 and 3 are summarized in FIG. 9.

(4) Results

As obviously seen from FIG. 6, the examples 1 and 2 are able to provide better purification of an exhaust gas, which achieves rates for purification of PM and $NO_x$ not less than 80%. In contrast, the example 3 shows inferior results, a remarkably low rate of 30% for purification of PM and a rate of 60% for purification of $NO_x$.

Foreign priority document, JP 2004-106440 filed on Mar. 31, 2004, is hereby incorporated by reference.

What is claimed is:

1. A system for purifying an exhaust gas comprising:
   a plasma unit generating energetic plasma species which react with particulate matters and nitrogen oxides contained in the exhaust gas;
   a catalyst unit comprising a unit for catalyst for selective reduction of nitrogen oxides which is disposed downstream relative to the plasma unit in the direction of flow of the exhaust gas and having a catalyst which reacts with the exhaust gas; and
   an adsorption unit comprising a unit for nitrogen oxide adsorptive catalyst which is disposed between the plasma unit and the catalyst unit,
   wherein the system provides sequential purification for the particulate matters and the nitrogen oxides.

2. A system according to claim 1 further comprising an oxidation catalyst unit downstream relative to the catalyst unit in the direction of flow of the exhaust gas.

3. A system according to claim 1, wherein the plasma unit is adapted to generate more of first energetic plasma species upstream, which principally react with the particulate matters and more of second energetic plasma species downstream, which principally react with the nitrogen oxides.

4. A system according to claim 3, wherein the plasma unit comprises a first plasma unit for generating the first energetic plasma species and a second plasma unit for generating the second energetic plasma species, and the first plasma unit is disposed upstream relative to the second plasma unit.

5. A system according to claim 4, wherein a power density of plasma space generated by the first plasma unit is not less than 0.8 W/cm$^3$ and a power density of plasma space generated by the second plasma unit is from 0.4 to 9.5 W/cm$^3$.

6. A system according to claim 4, wherein the catalyst comprises a catalyst for selective reduction of nitrogen oxides.

7. A system according to claim 6 further comprising a temperature sensor, wherein the system activates the second plasma unit when a temperature of the catalyst for selective reduction of nitrogen oxides detected by the temperature sensor is not less than a predetermined active temperature.

8. A system according to claim 7 further comprising a unit for adding reductant which is disposed upstream relative to the catalyst unit in the direction of flow of the exhaust gas, wherein the unit adds a reductant to the exhaust gas when the temperature of the catalyst for selective reduction of nitrogen oxides is not less than the predetermined active temperature.

9. A system according to claim 6 further comprising an oxidation catalyst unit downstream relative to the catalyst unit in the direction of flow of the exhaust gas.

10. A system according to claim 1 further comprising a temperature sensor, wherein the system activates the second plasma unit when a temperature of the catalyst for selective reduction of nitrogen oxides detected by the temperature sensor is not less than a predetermined active temperature.

11. A system according to claim 10 further comprising a unit for adding reductant which is disposed upstream relative to the catalyst unit in the direction of flow of the exhaust gas, wherein the unit adds a reductant to the exhaust gas when the temperature of the catalyst for selective reduction of nitrogen oxides is not less than the predetermined active temperature.

12. A system for purifying an exhaust gas comprising:
   a plasma unit for generating energetic plasma species which react with particulate matters and nitrogen oxides contained in the exhaust gas, the plasma unit is adapted to generate more of first energetic plasma species upstream, which principally react with the particulate matters and more of second energetic plasma species downstream, which principally react with the nitrogen oxides, the plasma unit comprises a first plasma unit for generating the first energetic plasma species and a second plasma unit for generating the second energetic plasma species, and the first plasma unit is disposed upstream relative to the second plasma unit;
   a catalyst unit having a catalyst which reacts with the exhaust gas, the plasma unit is disposed upstream relative to the catalyst unit in a direction of flow of the exhaust gas, the catalyst comprises a catalyst for selective reduction of nitrogen oxides and the system provides sequential purification for the particulate matters and the nitrogen oxides; and a unit for nitrogen oxide adsorptive catalyst which is disposed between the second plasma unit and the catalyst unit, wherein the system provides sequential purification for the particulate matters and the nitrogen oxides.

13. A method for sequentially purifying an exhaust gas including particulate matters and nitrogen oxides, the method comprising the steps of:

generating energetic plasma species which react with the particulate matters and the nitrogen oxides;

after generating the energetic plasma species, purifying the exhaust gas with a catalyst using a unit for catalyst for selective reduction of nitrogen oxides; and after generating the energetic plasma species, purifying the exhaust gas by adsorption before purifying the exhaust gas using the catalyst, wherein the adsorption is performed using a unit for nitrogen oxide adsorptive catalyst.

14. A method according to claim 13, wherein the generating step comprises the steps of:

generating first energetic plasma species which principally react with the particulate matters; and generating second energetic plasma species which principally react with the nitrogen oxides.

* * * * *